United States Patent

Pahr

[11] Patent Number: 6,078,463
[45] Date of Patent: Jun. 20, 2000

[54] METHOD AND SYSTEM FOR GENERATING A POSITION ERROR SIGNAL FROM RECORDED SERVO DATA TRACKS CONTAINING INFORMATION REPRESENTED BY LONGITUDINALLY SPACED, MAGNETIC TRANSITIONS

[75] Inventor: Per Olaf Pahr, Lier, Norway

[73] Assignee: Tandberg Data ASA, Oslo, Norway

[21] Appl. No.: 08/956,115

[22] Filed: Oct. 24, 1997

[51] Int. Cl.[7] .............................. G11B 5/584; G11B 5/09
[52] U.S. Cl. .......................................... 360/77.12; 360/48
[58] Field of Search ................................ 360/48, 46, 65, 360/77.08, 78.04, 53, 77.12

[56] References Cited

U.S. PATENT DOCUMENTS

| | | |
|---|---|---|
| 4,519,007 | 5/1985 | Sellars . |
| 4,642,709 | 2/1987 | Vinal . |
| 4,652,945 | 3/1987 | Marchant . |
| 5,285,331 | 2/1994 | White . |
| 5,309,299 | 5/1994 | Crossland et al. . |
| 5,394,277 | 2/1995 | Pahr et al. ............................. 360/53 |
| 5,555,142 | 9/1996 | Komai et al. . |
| 5,825,579 | 10/1998 | Cheung et al. ..................... 360/77.08 |
| 5,838,512 | 11/1998 | Okazaki ............................. 360/78.04 |

FOREIGN PATENT DOCUMENTS

| | | |
|---|---|---|
| OS 29 06 956 | 9/1980 | Germany . |
| OS 33 30 077 | 2/1985 | Germany . |
| WO 91/04555 | 4/1991 | WIPO . |
| WO 96/30897 | 10/1996 | WIPO . |

*Primary Examiner*—W. Chris Kim
*Attorney, Agent, or Firm*—Hill & Simpson

[57] ABSTRACT

A system and a method are provided for making magnetic recording servo tracks with inherent dropout robustness and with encoded track set information, longitudinal position information and other information recorded during tape or disk manufacture. A tape is provided having at least two servo tracks of opposite polarity recordings separated by a transition region. Servo data signals are produced for recording on the at least two tracks of the tape during a single pass during manufacture of the tape. The servo data signals are derived from MR elements that determine the polarity of the servo data signals.

17 Claims, 7 Drawing Sheets

METHOD AND SYSTEM FOR GENERATING A POSITION ERROR SIGNAL FROM RECORDED SERVO DATA TRACKS CONTAINING INFORMATION REPRESENTED BY LONGITUDINALLY SPACED, MAGNETIC TRANSITIONS

BACKGROUND OF THE INVENTION

The present invention is directed to a method and a system for generating a position error signal for controlling positioning of a data transfer head in a magnetic medium recording system. More specifically, the present invention relates to a method for use in current servo systems. More specifically, the present invention relates to a servo recording and reading method which is robust against signal dropouts.

Servo tracks have been in use for many years for data recording on magnetic disk files and magnetic tape. Of course, various other implementations exist.

For magnetic disks, a short overview can be found in G. Tyson Tuttle: "*Disc Drive Servo Techniques*," (Mead Microelectronics Inc. course, 'Electronics for Magnetic Storage Devices,' Austin, Tex., Oct. 9–13, 1995). Disks most often have embedded servo in servo sectors interleaved with data sectors. These servos are, therefore, sampled data systems. A typical sampled servo field format for a set of four data tracks consists of a gap to the data sector, a preamble used for AGC, sync mark, Gray code, constant-frequency bursts A, B, C, D recorded in a pattern and defining the actual radial servo information and a gap to the data. See Tuttle for a further explanation regarding a sampled servo field format.

Of particular relevance to the present invention is the sampled data system, the encoding in the Gray code field of various servo-related information in the form of sector address, track identification number, head number etc., and the method of extracting the read head position error signal (PES) from the amplitudes measured of the constant-frequency bursts A, B, C and D occurring one after each other. Especially, the exact sampling point in time of these frequency bursts is determined by the sync mark.

The servo information needed for a data track or a set of data tracks in the case of multichannel recording on tape is, therefore, usually a carrier recording of a pattern which defines at least two servo track center lines along the longitudinal length of the tape. For disk file servos, circles apply. The servo information content is, therefore, very low. The servo lines or circles are thus fixed references for a closed loop regulator, i.e. a servo.

For data storage on magnetic tape, other types of servo systems are in use or have been proposed. These can be divided into servo methods for helical scan tape drives and for longitudinally recorded data tracks, for example, servo tracks used for serpentine recording of one or more data channels in tape drives.

A common principle to most of these servo systems which use signal amplitudes to derive the servo PES is that, if the signal either is continuous in time or has a single measurement sample per servo PES sample, two or more frequencies are used to determine the polarity of the PES. On the other hand, if two or more samples are used to calculate a single PES sample, one single wavelength can be used, and the polarity of the PES is determined from the servo pattern. In this regard, see Tuttle. Another example is the servo recording used in the 5-¼" data cartridge for ¼" tape. In this regard, see U.S. Pat. Nos. 5,394,277 and 5,568,327, both to Pahr et al. FIG. 2 of each patent teaches a single wavelength that is used, and the PES polarity is determined when the correct track number is known.

Other servo systems use pulse-time information to derive the PES. These methods will not be further described here, as they are less relevant to the present invention.

When two or more wavelengths are used to record servo information and when the servo signal is extracted from the amplitudes of the servo carriers sampled at the same time, an inherent problem exists due to the well-known wavelength-dependent spacing loss, or "Wallace loss". In this regard, see Finn Jorgensen: *The Complete Handbook of Magnetic Recording* ($3^{rd}$ ed., TAB Professional and Reference Books, Blue Ridge Summit, Pa.), page 119. Spacing losses are 55·d/$\lambda$ dB, where "d" is the spacing and "$\lambda$" is the wavelength. For example, if two wavelengths are used for the servo carriers so that $\lambda_2=2\cdot\lambda_1$ and the normal spacing is $d_1=\lambda_1/5$ without any signal drop out, the spacing losses are normally 11 dB for $\lambda_1$ and 5.5 dB for $\lambda_2$. The difference of 5.5 dB in the wavelength response must be equalized or accounted for during a servo sample. However, during a signal dropout, the spacing could be $d_2=2\cdot d_1$. Spacing losses are then 22 dB for $\lambda_1$ and 11 dB for $\lambda_2$.

Assuming that a fixed equalization of 5.5 dB has been used, the measurement error is 5.5 dB when the servo sample occurs during, for example, signal dropout. This is a significant error, and it is inherent to the magnetic reading process and to the use of two or more wavelengths for the servo. Note that the actual spacing distance "d" is a random variable for signal dropouts, and it cannot be predicted for each servo sample. However, if the sampled amplitude of a third wavelength $\lambda_3$, which is not sensitive to the transversal or radial position of the servo read head, has a simultaneous measured change from its normal average value, the change in spacing can be calculated for this wavelength by a signal processor. When the actual change in spacing is known, the zero-PES values for $\lambda_1$ and $\lambda_2$ can be calculated. This is a difficult and computational intensive task to implement, and it causes limitations in the sample rate of the servo. Also, since amplitudes are measured by averaging over several wave periods, the method is not accurate for a non-linear spacing loss.

If two or more wavelengths are used to record the servo information, a calibration problem is present due to the wavelength-dependent response of the read head. Two different wavelengths generally have different amplitude responses. It is seldom that these responses are perfectly equalized so that the deviation can be ignored. Each read head must be precisely calibrated for a wavelength response if two or more wavelengths are used for the servo information carrier. Furthermore, due to read head wear, recalibration may be needed. In fact, the short wavelength response of a read head improves after a certain wear time. At the end of a life time for the read head, the short wavelength response finally degrades.

Choosing a single wavelength to write a servo pattern as commonly used for a hard disk and for the 5-¼" data cartridge for ¼" tape, spacing losses change over the pattern during a signal dropout and cause significant errors when the PES is calculated. The reason for this is that the pattern extends over a longitudinal distance or over a sector. Hence, a need exists for a method which extracts the servo information from a single position on the magnetic media.

Using magneto-resistive (MR) read heads, the servo information should not be degraded much during MR noise or so-called "thermal hits" when asperities in the magnetic media cause local heating of the tiny MR elements and a shift in the element's resistance.

Another need exists to increase the sample rate of the servo information. Ideally, to be more robust against built-in random defects in the magnetic media and also long-term wear of the media, the servo information should be recorded in a continuous manner along the longitudinal or circular servo tracks and also distributed transversely or radially over more than one servo track. This is not the case for a sector servo on current disk files. The accuracy of a sampled servo system often suffers because the sampling rate often ends up as a compromise between sampling rate and time needed for computing and validation of the servo samples.

Precision servo systems require recording of the servo tracks during manufacturing of the tape or disk. The servo information recorded should be of a fixed type not to be changed later during the use of the tape, or redundant servo information should be provided so that the disk or tape is robust against damage in servo areas.

Quick file access is also an important need so longitudinal position information (LPI) should be recorded as part of the physical servo recording. For disk files, such information is included in the Gray code field. For magnetic tape, if such longitudinal information is recorded, it also opens up possibilities for implementing longitudinal tape position servo control also during data file acquisition or for data file writing. In fact, the tacho signal generator in the capstan motor can be removed, and the true speed of the tape can be determined from the LPI.

Identification of the track number (track ID) or track set number is needed for feedback of the correct read head position after servo lock to a desired track or track set. Similar to the Gray code pre-written in the servo sectors in the disk files, magnetic tape used for serpentine recording must include track ID. The track ID should be recorded on the same write head pass as used for recording the servo signals. The reason for this is that, if the servo information is first recorded and then on a second pass the track ID is recorded, there is a certain probability that the track ID is written on the wrong track, and there is a need to verify that the track ID actually was written on the correct track.

Hereinafter, Track ID, LPI and other signals, for example, Manufacturer's ID (MID) and signals defining the Center of Tape (COT) area, are called servo data signals.

SUMMARY OF THE INVENTION

Improvements directly related to the physics of the magnetic reading process have been found such that the present invention is inherently more robust to signal dropouts than other servo systems which are based on amplitude measurements of one or more recorded wavelengths. Servo measurement bandwidth or servo sampling rate is improved by at least two orders of magnitude as compared with current servo systems.

The inventive apparatus and method also fulfill the important need of including servo-related information and non-servo information in the same recording as used for the servo signal. In this regard, see U.S. Pat. No. 5,394,277 to Pahr et al. The method found is generic; any type of data information can be recorded as part of the servo signal. If longitudinal position information is included in a tape servo pattern, the present invention also makes a two-dimensional servo possible.

The above object is achieved in accordance with the principles of the present invention in a method for producing a position error signal for a data transfer magneto-resistive (MR) head in a magnetic medium recording system, including the steps of providing a magnetic recording medium having a longitudinal extent and having adjacent servo data tracks recorded thereon, each servo data track containing identical information formed by a series of longitudinally spaced magnetic transitions, said magnetic transitions in the two servo tracks being respectively oppositely polarized, the two servo tracks bordering each other along a servo line, nominally positioning the MR data transfer head over said two servo tracks and dividing said MR read element into two ½ MR read elements, disposed side-by-side, by providing said MR read element with a sense sensor tap, common to both of said ½ MR read elements, and generating respective voltage signals from said ½ MR read elements dependent on resistance changes produced by said magnetic transitions, and generating the position error signal dependent on the voltage signals and without reference to any predetermined pattern of magnetic transitions, and positioning the MR data transfer head relative to said servo line dependent on said position error signal.

In an embodiment, the servo data signals are position error signals wherein a positive pulse occurs at a first time when a ½ MR element has a full signal amplitude and a ½ MR element has a reduced amplitude.

In an embodiment, a peak of the measured voltages output by the MR elements is detected and produces positive and negative signals corresponding thereto. Differences between the positive and negative signals are compared to determine a position error signal.

In an embodiment, the position error signal is normalized.

In an embodiment, a time constant for averaging the detected peaks over a plurality of servo data transitions is set.

In an embodiment, the position error signal is validated.

In an embodiment, the servo data signals include track number identification, longitudinal position information, manufacturer's identification and/or center of tape area.

In an embodiment, servo data signals are separated from the voltage signals. The servo data signals are deformatted and the servo data signal having a correct error flag is selected. The selected servo data signal is decoded to provide a set of selected servo data signals.

The set may include track number identification, longitudinal position information, manufacturer's identification and/or center of tape area.

The above object is also achieved in accordance with the principles of the present invention in a system for producing a position error signal for positioning a magneto-resistive (MR) data transfer head, the system including a magnetic recording medium having a longitudinal extent and having adjacent servo data tracks recorded thereon, each servo data track containing identical information formed by a series of longitudinally spaced magnetic transitions, the magnetic transitions in said two servo tracks being respectively oppositely polarized, and the two servo tracks bordering each other at a servo line, and wherein the MR data transfer head is divided into two ½ MR read elements by a sense center tap, common to both of said ½ MR read elements, with the ½ MR read elements generating respective voltage signals dependent on resistance changes produced by the magnetic transitions, and having a circuit for generating the error position signal dependent on the voltage signals and without reference to any predetermined pattern of magnetic transitions, for use in controlling the position of the MR data transfer head relative to the servo line.

In an embodiment, the servo data signal is a position error signal.

In an embodiment, the servo data signal includes track number identification, longitudinal position information, manufacturer's identification and/or center of tape area.

In an embodiment, a module is provided for receiving the positive and negative signals wherein the module normalizes the signals producing a position error signal.

In an embodiment, a module is provided for receiving the positive and negative signals wherein the module validates the signals producing a position error signal.

In an embodiment, sense leads are connected to the magneto-resistive elements.

In an embodiment, filter modules receive the voltage signals wherein the filter modules include a low pass filter and equalizer to process the voltage signals.

In an embodiment, the normal position error signal is performed at a high rate and limited only by mechanical parts of the servo system.

In an embodiment, a separator separates the servo data signal from the voltage signals. A selector deformats the servo data signal and selects the servo data signal having a correct error flag. A decoder provides a set of selected servo data signals from a decoded one of a selected servo data signal.

In an embodiment, the set includes track number identification, longitudinal position information, manufacturer's identification and/or center of tape area.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
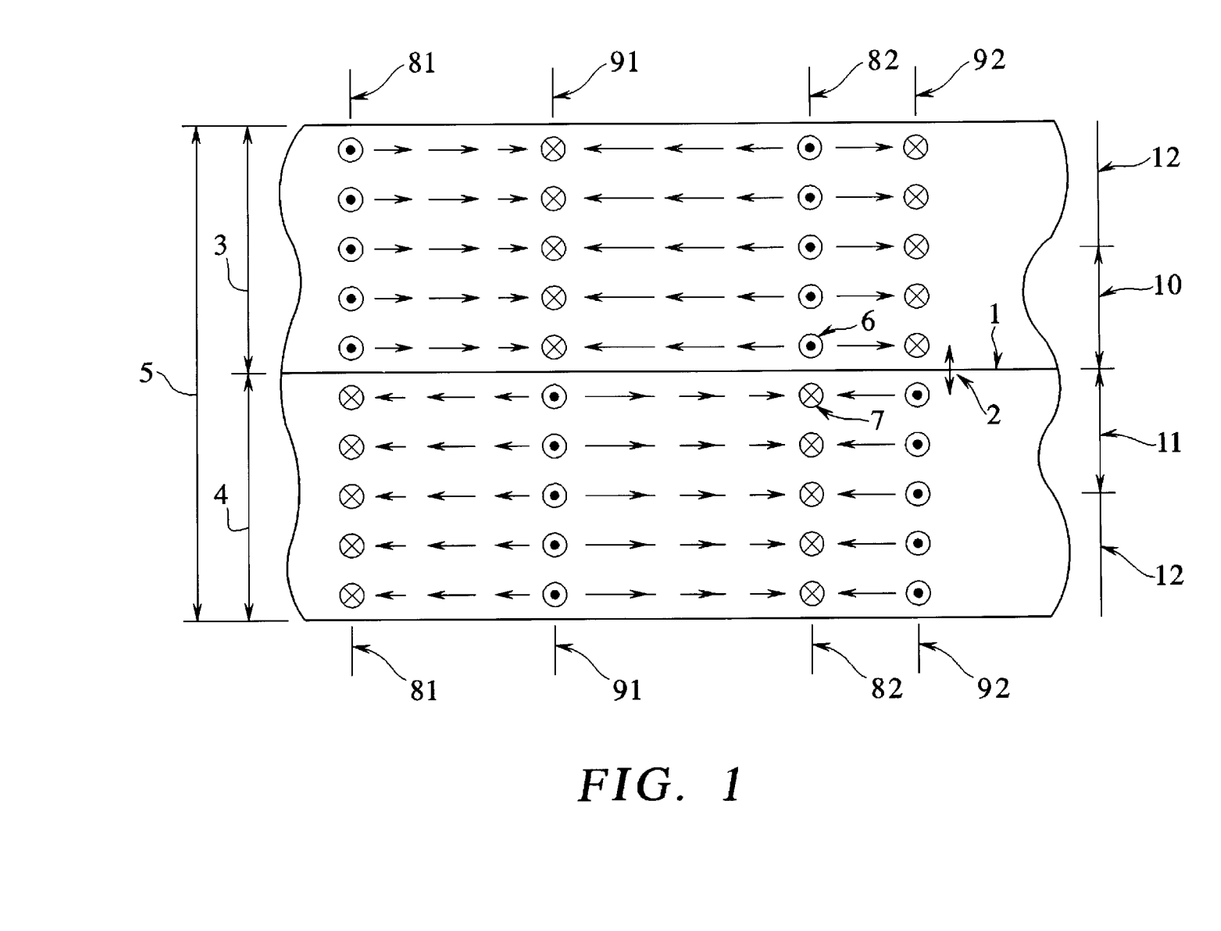
FIG. 1 illustrates an embodiment of a servo track of a tape made in accordance with principles of an embodiment of a method of the present invention.

Referring now to FIG. 1, the method used for the magnetic recording which, in this case, defines a single servo track is more clearly illustrated. The present invention defines a servo line or a small linearized part of a servo sector line in the case of disk files as a centerline 1 of a narrow transition region 2 between two continuous and adjacent recordings 3 and 4 of opposite magnetic field polarity or directions of magnetizations as shown. The two recordings 3,4 form a complete servo track 5 as shown in FIG. 1 and have identical longitudinal information content. This information may be of any type as previously described and is defined as servo data signals. The directions of the magnetizations are shown with arrows with north poles 6 and south poles 7 (part of transitions in an NRZI recording).

As shown in FIG. 1, the north poles 6 and the south poles 7 are always located on the same transversal lines which are partly shown as segments 81,91, and 82, 92 in FIG. 1.

From a physical point of view, the transition region between poles of opposite polarity and laying along the same transversal line is well-defined by magnetic field lines with components parallel to the transversal lines 81,91 and 82,92 where these lines cross the servo line 1 in FIG. 1. It is known that the transition zone between the perpendicular fields 6 and 7 are well defined. In this regard, see, for example, Jorgensen, pages 60 and 61, FIG. 3–33 therein and, in particular, the lower right part of FIG. 3–33. The accuracy in the transversal location is, therefore, inherently good, and sub-micrometer transversal accuracy in the servo recording itself can be expected. Even between the transitions and for longitudinal recordings, for example, between lines 81 and 91 and along the servo line 1, the servo region is well defined. As will be explained below, the servo position error and the servo data signals are derived from a set of magnetic read head pulses of opposite polarity measured at longitudinal positions as defined by the poles shown on the lines 81,91 and 82,92 in FIG. 1.

Because of the use of a center tapped MR read head, both logic signals to determine the correct polarity of the servo signal and two read signals to detect the servo data signals are also available from the two ½-MR-elements. These ½-MR signals have one half the magnitude of a normal data MR signal, but they occur simultaneously and provide redundancy in case of small media defects under only one of the ½-MR elements, so the effective S/N ratio is approximately the same. In fact, during servo off-track conditions, always one of these ½-MR signals have a maximum amplitude due to the built-in guard bands 12 shown in FIG. 1. Neither polarity signals nor servo data signals are, therefore, lost, except in the case of a media defect under only one of the ½-MR elements. However, this is of minor importance due to the vast redundancy in the number of servo samples; single defects are negligible during averaging.

The present invention further provides an option for switching to a full 1/1-MR servo error signal to extract the servo data signals in case the servo is not in the locked mode.

The detection of the pulses will now be explained hereinafter. In FIG. 1, two read elements have their nominal transversal positions as generally illustrated by line segments 10 and 11 along the same centerline as defined by the extensions of the two line segments 12. The upper read gap gives, therefore, always read pulses at the same longitudinal positions as the lower read gap, regardless of the longitudinal information content. In FIG. 1, the added widths of the read gaps 10 and 11 are about ⅔ of a total width 5 of the servo track. Half of this difference is the allowable range for tracking tolerances in the tape drive, i.e. the difference between the lengths shown at 3 and 10. These regions are necessary for several reasons, for example, in a tape drive, due to servo track slope relative to the longitudinal line between the write and read elements on the read-while-write heads; due to servo tracking errors; and also to take care of edge effects where the bias current leads contact the MR elements.

Figure 2:
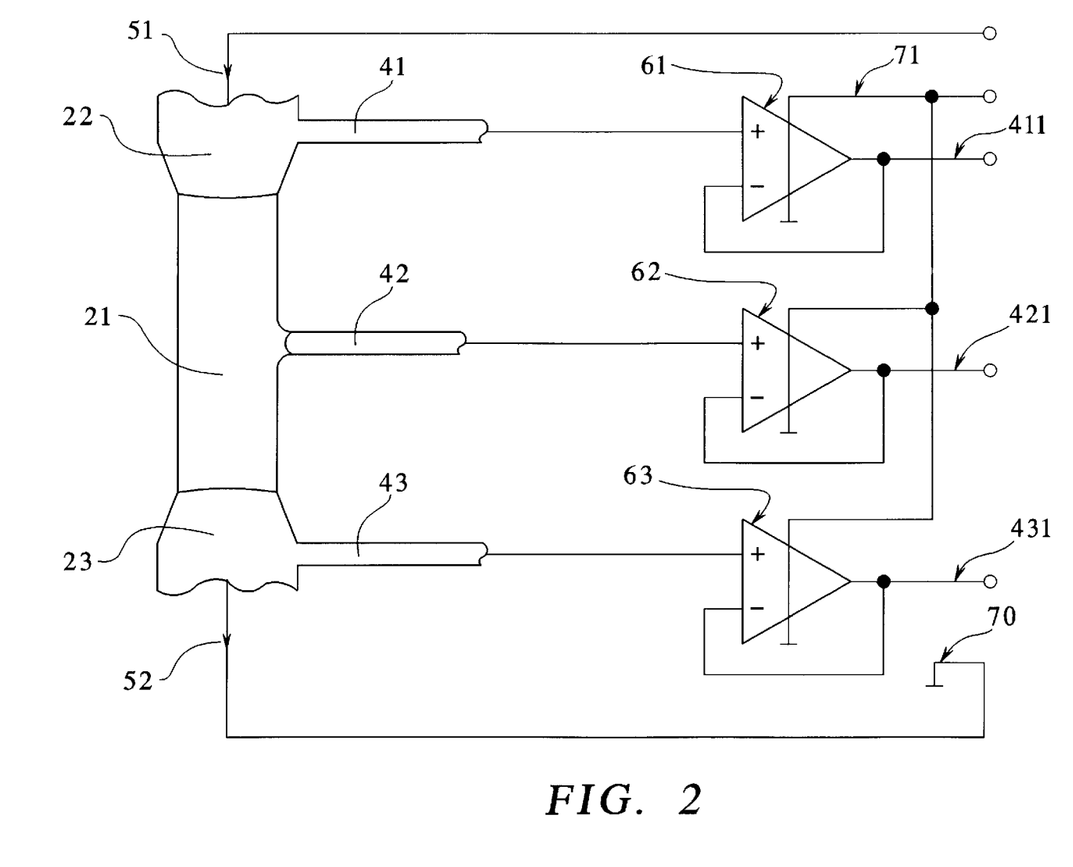
FIG. 2 illustrates a planar view of an embodiment of a circuit for producing logic signals that determine polarity of a servo error signal.

Each servo track as shown in FIG. 1 consists of two opposite polarity recordings separated by a very narrow and well-defined zone (<0.5 $\mu$m). These recordings are written by the tape manufacturer using normal data signaling and with a normal Run-Length-Limited (RLL) code, for example, a (1,7)-constrained 2/3-rate code. The recordings are in perfect anti-phase in the longitudinal direction of the tape and are written by a split-gap write head and with the same write current. These recordings are read by a center tapped head as two separate signal channels as shown in FIG. 2 which explains how these two channels may be picked up from a single-ended MR element. FIG. 2 also contains a reference low-side buffer amplifier 63.

Referring now to FIG. 2, the full 1/1 MR element is illustrated at numeral 21. It is shown in a planar view, i.e. a top view in a thinfilm process. A photograph from such a planar view is shown, for example, in FIG. 3 of Robert E. Fontana et al. "*Submicron Trackwidth and Stripe Height MR Sensor Test Structures*" (IEEE Transactions on Magnetics, Vol. 32, No. 5, Sep. 1996, pp. 3340–3442.) Fontana et al. also show cross-sectional views of such MR elements. In FIG. 2 of the present invention, only the top leads 22 and 23 are shown. The leads 22 and 23 carry an identical bias current 51 and 52 coming from a current source so that changes in the MR resistance can be measured as voltages.

Beneath the leads 2 and 3 are leads for longitudinal bias which are not shown. However, the same is shown in Fontana et al., the disclosure of which is incorporated herein by reference in its entirety. In FIG. 2, sense leads 41, 42 and 43 which carry small signal $\mu A$ currents only are shown. The sense leads 41, 42 and 43 go directly to the buffer amplifiers 61, 62 and 63 and have buffered outputs 411, 421 and 431. Note the sense lead 43 of the low side 23 of the MR-element 21. In some cases, the buffer amplifier 63 can be avoided or removed. Then, the output 431 is connected directly to the sense lead 43. The choice depends on noise considerations, e.g. cross talk noise from data write signals in a read-while-write head. It is important to note that the center lead 42 is not a ground point because the MR-element is still a single-ended element. Any DC currents in the center lead 42 may disturb the magnetic field distribution in the MR element. Adding the sense leads 41, 42 and 43 is compatible with the process used to fabricate the sensor. For tape drives with MR heads, 5 $\mu m$ wide read elements, for example, can be made. Using a 0.18 $\mu m$ CMOS mask process, thin film MR head features can be as small as 0.7 $\mu m$ as taught by Fontana et al. This also fits well with a narrow servo zone of less than 0.5 $\mu m$. The width of the track is then 7.5 $\mu m$.

In FIG. 2, the sense leads 41 and 42 connect to the upper ½ MR element which is called ½ $MR_p$. The sense leads 42 and 43 connect to the lower ½ MR elements which is called ½ $MR_m$. Logic signals derived from these ½ MR elements determine the polarity of the servo error signal. This determination will be explained below. Also, the servo data signal is detected from these ½ MR signals.

Figure 3:
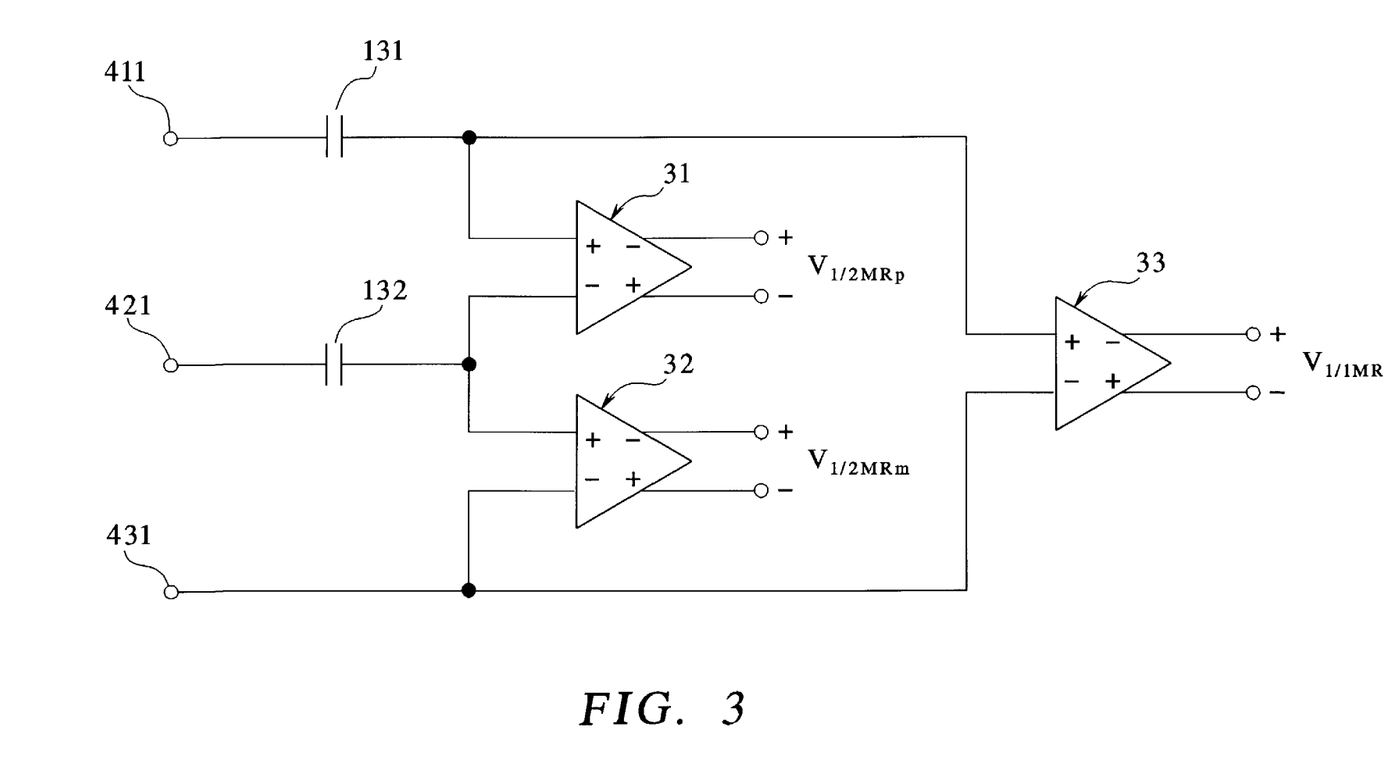
FIG. 3 illustrates a circuit diagram for producing ½ MR small voltage signals given the outputs of the circuit in FIG. 2.

Referring now to FIG. 3, the amplifier outputs 411, 421 and 431 from FIG. 2 are shown as input lines. At least two of these lines are AC-coupled with capacitors 131 and 132. Differential amplifiers 31, 32 and 33 are used to obtain the ½ MR small signals "$v_{1/2MRp}$" and "$v_{1/2MRm}$" and the 1/1 MR signal "$V_{1/1MR}$". Note that all these signal amplifiers have differential outputs. The reason for this choice is evident later; however, the reason is not only related to noise considerations.

Figure 4A:
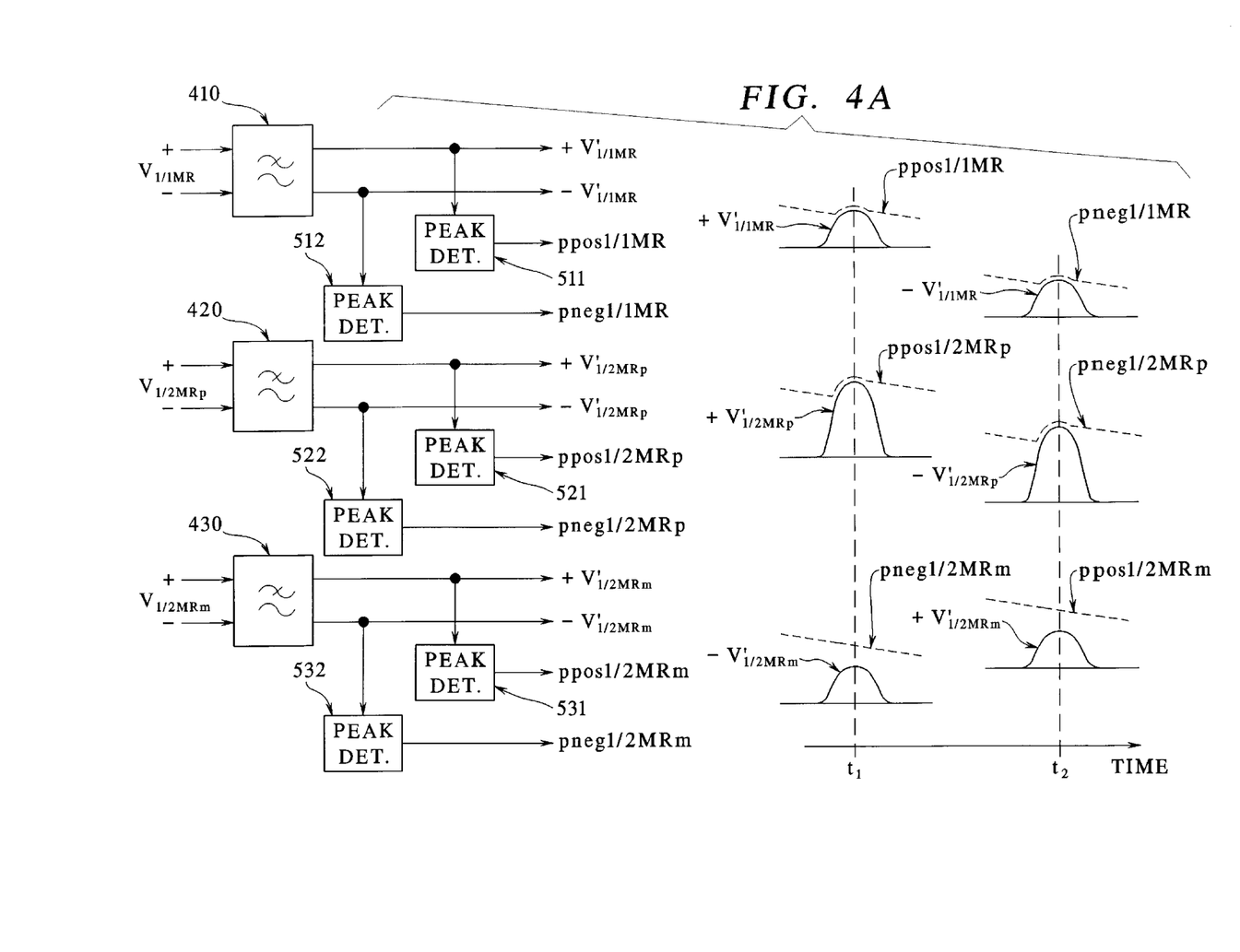
FIGS. 4A and 4B illustrate circuit diagrams used to provide a positive servo position error signal.

Referring to FIG. 4A, the three small signals $v_{1/2MRp}$, $v_{1/2MRm}$ and $v_{1/1MR}$ are low pass filtered and equalized in filter modules 410, 420 and 430, respectively. The signals are then available in pairs to process in an antiphase, single-ended version, namely $+v'_{1/2MRp}$, $-v'_{1/2MRp}$, $+v'_{1/2MRm}$, $-v'_{1/2MRm}$, $+v'_{1/1MR}$ and $-v'_{1/1MR}$. Each component in a pair of signals contains the same information. The peak rectifiers and signal hold circuits 511, 512, 521, 522, 531 and 532 are of the same type, i.e. they detect only positive going pulses or peaks in the signal. This principle has been previously described, for example, in U.S. patent application Ser. No. 08/637,183 to Pahr in FIGS. 1, 2 and 3 therein, where positive and negative thresholds are set up for a comparator. Also of importance, in an analog implementation, is that excellent matching is obtained using peak rectifier detectors of only one type.

FIG. 4A shows the signals when a positive PES is extracted. Then, the ½$MR_p$ element has a full signal amplitude, and the ½$MR_m$ element has a reduced amplitude. This occurs for both positive and negative pulses in the servo data signal.

Figure 4B:
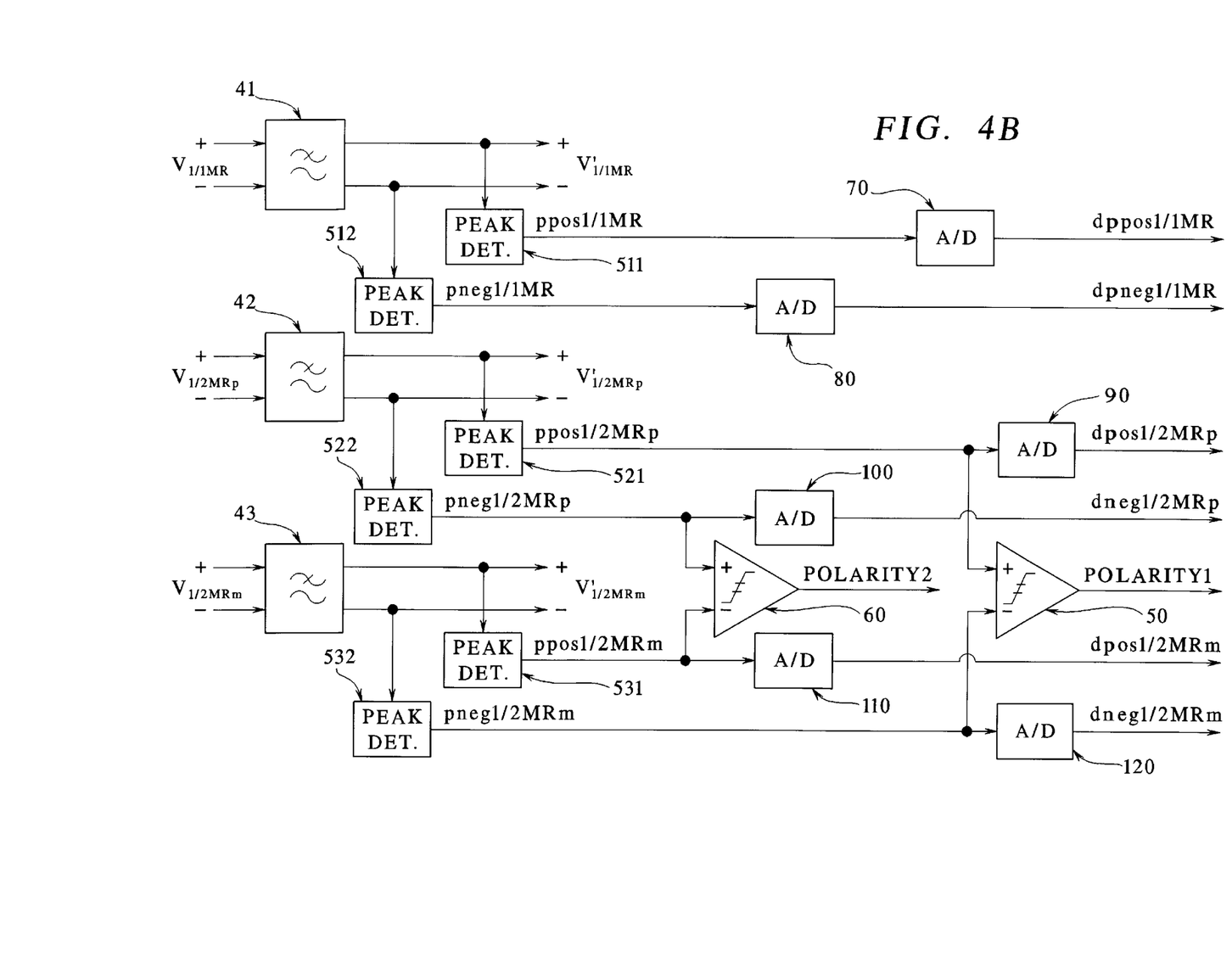

The time when a positive pulse occurs in the signal $+v'_{1/2MRp}$ is called $t_1$. Since the lower MR-element just then at $t_1$ is located over an opposite polarity transition and is displaced upwards and has crossed the servo zero-line, its negative amplitude has been reduced. At $t_1$, this occurs as a reduction in the positive amplitude of the antiphase signal $-v'_{1/2MRm}$. At $t_1$, the peak detector 521 responds, and its signal $ppos_{1/2MRp}$ is updated as shown in FIG. 4A. However, the peak detector 532 is not updated because it holds the signal from the previous time $t_1$ minus two servo data transitions, and because this signal $pneg_{1/2MRm}$ is greater than the incoming pulse, it is not updated. By comparing the difference between the signals $ppos_{1/2MRp}$ and $pneg_{1/2MRm}$, the PES polarity is determined by a comparator as shown in FIG. 4B. Normalization of the PES itself can now be done by using the known full-scale signal $ppos_{1/2MRp}$ as a reference for the error signal $ppos_{1/1MR}$. This can be done in subsequent circuits and is not shown.

The time when a negative pulse occurs in the signal $+v'_{1/2MRm}$ is called $t_2$. At this time, there is a full-scale positive pulse on the anti-phase line $-v'_{1/2MRp}$, and the detector signal $pneg_{1/2MRp}$ is updated as shown. Now, there is a reduced amplitude pulse on the line $+v'_{1/2MRm}$, and the detector signal $ppos_{1/2MRm}$ is not updated. The polarity of the PES is now determined as before, but by another comparator operating on the difference between the $pneg_{1/2MRp}$ and $ppos_{1/2MRm}$. Also, normalization and the calculation of the PES can take place. Thus, the circuit permits high speed operation and PES signals for each servo data transition. Note that the time constant of the four peak detectors in FIG. 4A may be set so that averaging is performed over several servo data transitions. This has the benefit that small media defects are averaged out, and, still, the vast redundancy is used to refresh the servo measurements. Normalization computation of the PES signal can, therefore, be done at the highest rate demanded by the mechanical parts of a servo system with good margins for averaging.

FIG. 4B shows two hysteris comparators 50 and 60 connected to give polarity signals "POLARITY 1" and "POLARITY 2". When these signals have a high logical level, the center of the MR read head is located above the servo track centerline. Note the redundancy. When the servo read head is correctly positioned, it may be within a narrow deadband. Therefore, the polarity should be changed when both of these signals become equal. This is done by a PES computing block as shown in FIG. 5.

In FIG. 4B, the error signals "$ppos_{1/1MR}$" and "$pneg_{1/1MR}$" are analog-to-digital converted in modules 70 and 80. The same is done with the other four peak detected signals in modules 90, 100, 110 and 120. FIG. 4B illustrates where to put the interface between the analog and digital signal processing. Other interface sections may also be chosen. Such interface sections are also within the scope of the invention. For example, the $v'_{1/1MR}$, $v'_{1/2MRp}$ and $v'_{1/2MRm}$ signals may also be A/D converted directly after the lowpass filters. Then, peak detecting and time averaging may also be performed.

The case of a negative PES is now shown in a separate figure. Using FIG. 4A, and assuming that a negative position displacement of the same magnitude has occurred at the same place, i.e. at time $t_1$, the amplitudes of $ppos_{1/2MRp}$ and $pneg_{1/2MRm}$ are interchanged, and the corresponding polarity signal has a low level. A similar interchange takes place at time $t_2$. Now, the peak detector 511 shows a positive pulse time $t_2$, and peak detector 512 shows a positive pulse at $t_1$.

Figure 5:
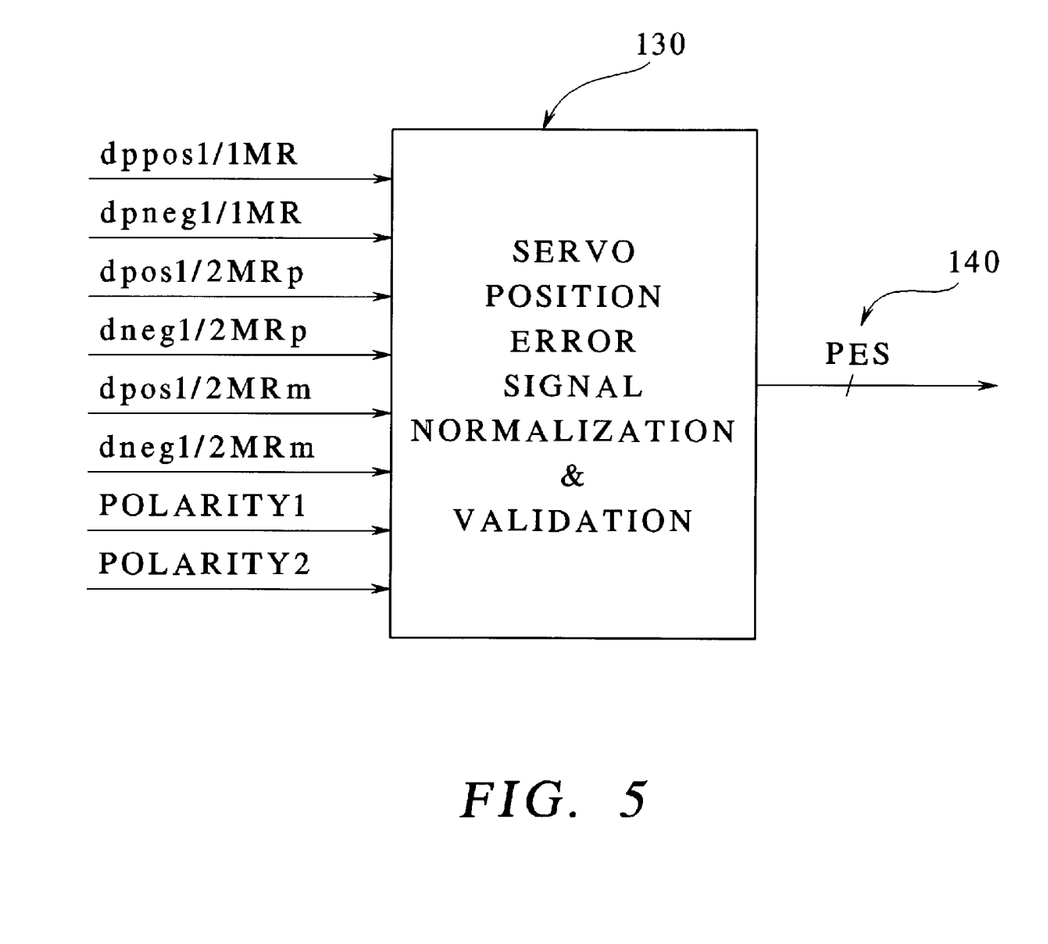
FIG. 5 illustrates a block diagram of a computing block for servo position error signal normalization and validation.

FIG. 5 shows the input signals to a module 130 which performs the actual normalization and sends a validated PES signal 140 to the actual servo module for further processing in the digital domain.

The basic principle to be used in module 130 in FIG. 5 is that the magnitude of the correct full-scale ½ MR pulse may be chosen as determined by the two polarity signals to normalize the error signals. Either one or two of the error signals may be chosen to be used from the ⅟₁ MR in FIG. 5, depending on the desired degree of accuracy. It is also possible to perform pulse asymmetry corrections in this module. The present invention, therefore, relates to servo recording used for the tape or disk itself, and the broad concepts used to measure and pre-process the servo signal and the servo data signals; therefore, the details of the digital module will not be further described.

Figure 6:
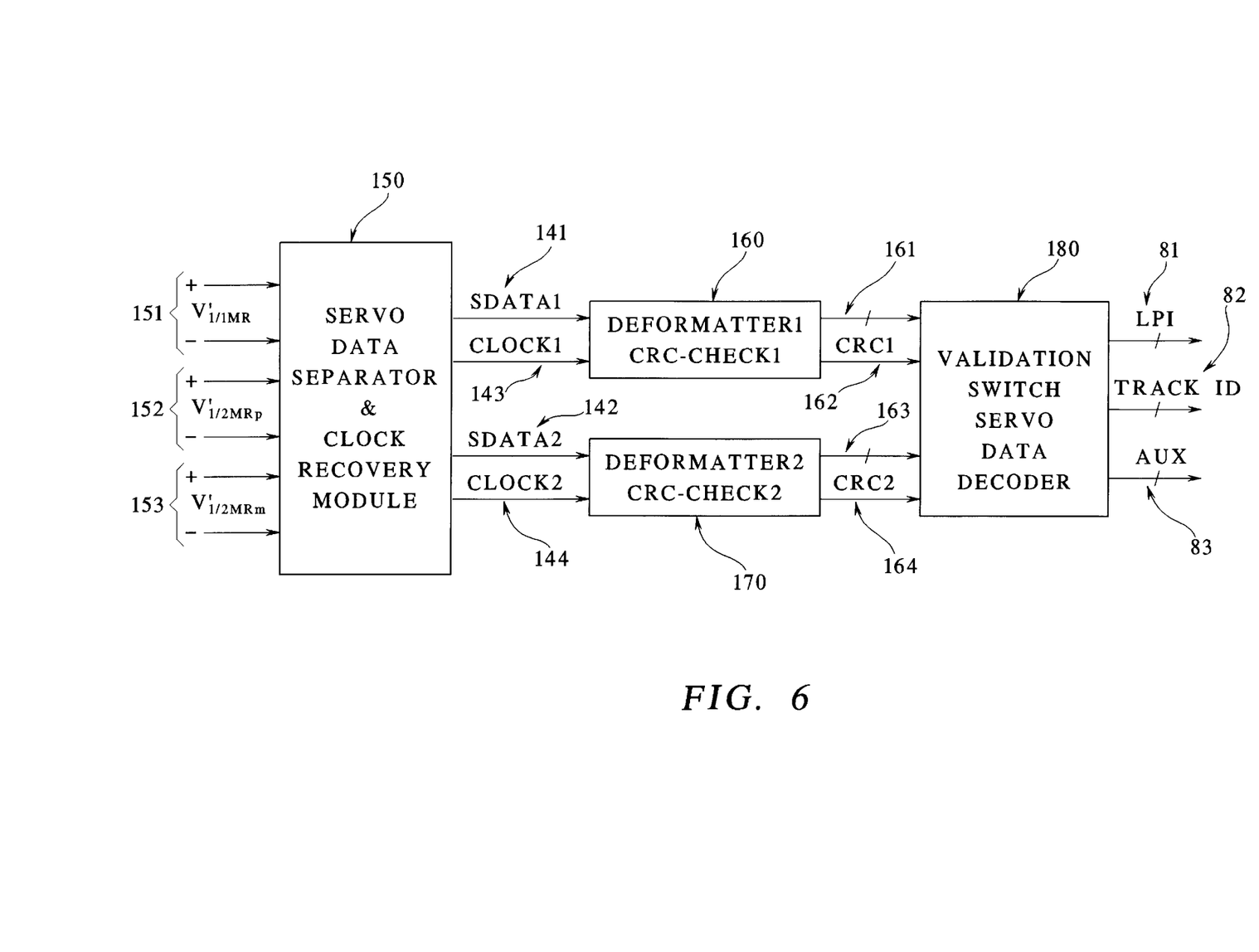
FIG. 6 illustrates a black box diagram of computing blocks for producing other servo data signals.

Referring now to FIG. 6, module 150 receives differential lowpass-filtered and equalized signals 151, 152 and 153 containing redundant servo data information. This part is a conventional read channel including clock recovery; however, it has three channel inputs and two channel outputs. Channel 1 is optionally used in the event that the servo is not in a locked mode as previously explained.

The servo data signals 141 and 142 are passed on to the deformatter and cyclic redundancy checkers 160 and 170, together with the recovered clock signals 143 and 144. The purpose of module 180 is to choose the servo data signal 161 or 163 which has the correct CRC error flag 162 or 164 and to decode this servo data to provide hardware signals 81 for LPI and 82 for Track ID. Additionally, other servo data signals, such as Manufacturers ID (MID), Cartridge Serial Number and Center of Tape (COT) signal may be generated and a signal provided on the AUX data bus 83.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for producing a position error signal for positioning a magneto-resistive (MR) data transfer head in a magnetic recording system, comprising the steps of:

providing a magnetic recording medium having a longitudinal extent and having adjacent servo data tracks recorded thereon each containing identical information formed by a series of longitudinally spaced magnetic transitions, said magnetic transitions in the two servo tracks being respectively oppositely polarized, and said two servo data tracks bordering each other at a servo line;

nominally positioning an MR data transfer head over said two servo tracks and dividing said MR data transfer head into two ½ MR elements with a common sense center tap and generating respective voltage signals with said two ½ MR elements dependent on resistance changes produced by said magnetic transitions; and generating a position error signal, for controlling a position of said MR data transfer head relative to said servo line, dependent on said respective voltage signals without reference to any predetermined pattern of magnetic transitions.

2. The method of claim 1 comprising generating said position error signal dependent or a positive pulse occurring at a first time when one of said ½ MR elements has a full signal amplitude and the other of said ½ MR elements has a reduced amplitude.

3. The method of claim 1 further comprising the steps of:

detecting a peak of the measured voltages respectively output by the ½ MR elements and producing positive and negative signals corresponding thereto; and comparing differences between the positive and negative signals to obtain a comparison result and generating said position error signal dependent on said comparison result.

4. The method of claim 3 further comprising the step of: normalizing the position error signal.

5. The method of claim 4 further comprising the step of: validating the position error signal.

6. The method of claim 3 further comprising the step of: setting a time constant for averaging the detected peaks over a plurality of said magnetic transitions.

7. The method of claim 1 comprising selecting the information contained in said servo data tracks from the group consisting of track number identification, longitudinal position information, manufacturer's identification and a center of tape designation.

8. The method of claim 1 further comprising the steps of:

reading said information contained in said servo data tracks using said MR data transfer head and generating servo data signals, dependent on said information, in addition to said respective voltage signals;

separating said servo data signals from said voltage signals; and decoding said servo data signals to obtain control signals for said magnetic recording system in addition to said position error signal.

9. A method as claimed in claim 1 wherein the step of providing a magnetic recording medium comprises providing a magnetic recording tape having said servo data tracks recorded thereon.

10. An arrangement for producing a position error signal in a magnetic recording system, comprising:

a magnetic recording medium having a longitudinal extent and having servo data tracks recorded thereon each containing identical information formed by a series of longitudinally spaced magnetic transitions, said magnetic transitions in said two servo tracks being respectively oppositely polarized, and said two servo tracks bordering each other at a servo line;

a magneto-resistive (MR) head nominally positioned over said two servo data tracks and having a sense center tap dividing said magneto-resistive transfer head into two ½ MR elements sharing said center tap, said two MR elements respectively generating voltage signals dependent on resistance changes produced by said magnetic transitions; and a circuit electrically connected to said MR data transfer head and supplied with said voltage signals for generating a position error signal dependent on said voltage signals, without reference to any predetermined pattern of magnetic transitions, for controlling positioning of said MR data transfer head relative to said servo line.

11. The arrangement of claim 10 wherein the information contained in said servo data tracks is selected from the group consisting of track number identification, longitudinal position information, manufacturer's identification and a center of tape designation.

12. The arrangement of claim 10 wherein said circuit includes:
 a detector for detecting a peak of said respective voltage signals and for producing positive and negative signals corresponding thereto; and
 a comparator for comparing differences between said positive and negative signals and for producing said position error signal dependent on a result of the comparison.

13. The arrangement of claim 12 further comprising:
 a module for receiving the positive and negative signals wherein the module normalizes the signals producing a position error signal.

14. The arrangement of claim 12 further comprising:
 a module for receiving the positive and negative signals wherein the module validates the signals producing a position error signal.

15. The arrangement of claim 10 further comprising:
 filter modules receiving the voltage signals, said filter modules including a low pass filter and equalizer to process the voltage signals.

16. The arrangement of claim 10 wherein said MR data transfer head additionally reads said information contained in said two servo tracks and generates servo data signals representing said information, and wherein said circuit includes means for separating said servo data signals from said voltage signals and for generating at least one control signal, separate from said position error signal, from said servo data signals.

17. An arrangement as claimed in claim 10 wherein said magnetic recording medium comprises a magnetic tape.

* * * * *